Nov. 27, 1962 R. P. HOLLAND, JR 3,065,929
AIRCRAFT HAVING AERODYNAMICALLY TILTABLE THRUST
Filed May 15, 1956 7 Sheets-Sheet 1

FIG. 1

Inventor *Raymond P. Holland Jr.*

Inventor
Raymond P. Holland Jr.

Nov. 27, 1962 R. P. HOLLAND, JR 3,065,929
AIRCRAFT HAVING AERODYNAMICALLY TILTABLE THRUST
Filed May 15, 1956 7 Sheets-Sheet 6

Inventor
Raymond P. Holland Jr.

Nov. 27, 1962 R. P. HOLLAND, JR 3,065,929
AIRCRAFT HAVING AERODYNAMICALLY TILTABLE THRUST
Filed May 15, 1956 7 Sheets-Sheet 7

Inventor
Raymond P. Holland Jr.

United States Patent Office 3,065,929
Patented Nov. 27, 1962

3,065,929
AIRCRAFT HAVING AERODYNAMICALLY
TILTABLE THRUST
Raymond Prunty Holland, Jr., 1702 W. Third St.,
Roswell, N. Mex.
Filed May 15, 1956, Ser. No. 584,920
9 Claims. (Cl. 244—12)

This invention relates to aircraft and particularly to apparatus for increasing the utilitarian applications of aircraft. It pertains to aircraft which are universal in the sense that they are capable of vertical take-off and landing, hovering flight, transitional flight to higher speeds, high speed flight, movements along the ground including running take-offs and landings, and operations from unprepared terrain under adverse conditions, said aircraft having simple means for control in each of the conditions and while changing from one condition to another, and having smooth-riding qualities in rough air.

The aircraft of this invention differs from existing vertical-rising aircraft in that the latter in each instance contains one or more shortcomings which prevent truly versatile and widespread use. Helicopters and flying platforms lack high speed performance. Tail-standing types lack piloting naturalness and functional versatility. Virtually all types experience mechanical complexities, or control difficulties, or both. Costs of construction and practical difficulties in operation have prevented the full development of the potential aircraft market in this field. This invention furnishes novel means for correcting these existing difficulties.

It is the broad object of this invention to produce an aircraft capable of vertical rising and high speed flight combining a high degree of versatility, reliability, simplicity, and economy, which may be controlled positively and naturally by an unskilled pilot in all phases of flight and ground handling.

It is an object of this invention to produce such an aircraft in a light weight, mechanically simple structure having low stresses, and therefore being reliable and inexpensive, leading to the broadest possible range of uses.

It is an object of this invention to provide such an aircraft in which the reaction streams used for lifting and propulsion are conveniently controllable in direction for producing the desired motions of the aircraft without requiring the entire aircraft to be rotated integrally with its reaction stream, and in doing so to achieve a versatile aircraft which can land and take off from non-level ground or in a wind without control difficulty or inconvenience, which can turn and taxi conveniently on the ground, and can make conventional running take-offs and landings when desirable.

It is an object of this invention to produce a compact vertical-rising aircraft, able to operate safely within narrow confines.

It is a further object of this invention to provide in this aircraft good protection against difficulties arising from partial power failures during hovering flight and the ability to make safe power-off landings in an emergency by gliding.

It is an object of this invention to provide a high degree of mechanical simplicity, and in particular to achieve all essential steering by means of a minimum number of pilot-operated aerodynamic surfaces, and in addition to achieve the rotation of the thrust resultant force between the vertical and horizontal directions (as required for vertical and horizontal flight) by aerodynamic means without mechanical actuating systems of any sort, through the action of two aerodynamic elevators in a process accompanying the operation of steering the aircraft.

It is a further object of this invention to provide the occupants of this aircraft with naturalness and facility in matters of posture and vision, heretofore absent in high speed vertical-rising aircraft.

It is a further object of this invention to extend this naturalness to the flight control system, to produce full control of the aircraft in response to simple and consistent steering operations during all flight and ground maeuvers, and in particular to achieve flight turns by turning the pilot's wheel and to achieve flight changes toward forward flight or toward hovering by moving the pilot's control column forward or rearward respectively.

Another object of this invention is to provide a vertical-rising aircraft which is not affected in its motions and behavior by nearness to the earth's surface, either by bodily tilting of the aircraft due to the contact with the ground causing the lift resultant to tilt from the vertical, displacing the aircraft across the ground in the direction of the tilt, or by aerodynamic interactions between the ground and the downwardly escaping reaction stream affecting aerodynamic surfaces and introducing extraneous forces and moments disturbing the lifting system.

Another object is to provide a vertical-rising aircraft which avoids the mechanical complexities, fatigue and noise problems, control difficultuies, high costs and speed limitations of the helicopter.

Another object is to provide an aircraft which alleviates the vertical accelerations due to atmospheric gusts.

Another object is to provide an aircraft which employs only one system for sustentation and control operative both at hovering and high speeds, avoiding the duplications of systems often found on vertical-rising aircraft, and thereby contributing to simplicity, economy and reliability.

Still another object is to provide an aircraft in which the propellers are enclosed for safety, keeping them from striking surrounding objects in hovering flight and protecting personnel when on the ground, especially when in use away from established airports.

Other objects and advantages of the invention may be readily inferred from the following descriptions of the invention.

In basic concept the invention consists of an aircraft having one or more members aerodynamically controllable in pitch which generate the major thrust of the aircraft and one or more members, usually body members, not requiring control in pitch which generate little or no thrust and which are free to weathervane, these members being connected on a horizontal pivot lying transverse to the flight direction. The powered thrusting member supports, propels and controls the aircraft in flight. It rotates to positions on the pivot axis and delivers amounts of thrust normal to the pivot axis as controlled by the pilot, performing these actions by means of its own propulsive reaction streams and the reaction streams due to relative motion through the atmosphere cooperating reactively with aerodynamic lifting and trimming surfaces located on the powered thrusting members, some of which are controllable by the pilot. For vertical rising the powered thrusting member is controlled to a position to produce vertical thrust and for forward horizontal acceleration it is controlled to a position to produce a forward horizontal force. Other positions are used to obtain reactions in other directions. The attitudes in pitch of a powered thrusting member on the transverse pivot member are independent of the attitudes of the adjacent non-powered body member.

The non-powered body portion of the aircraft rides freely on the transverse pivot, responding to moments due to gravity, acceleration, weight reactions when in contact with the ground, and aerodynamic weathervaning moments produced by the aerodynamic form exposed to the passing airstream. On the body member the center of gravity lies generally beneath the pivot causing it to hang in a near-horizontal attitude during zero speed flight. During translational motion through the air the body member aligns itself generally in the direction toward which motion exists, with a weathervaning tendency which is small at slow speeds and stronger at high speeds. It employs a fixed horizontal tail surface or its aerodynamic equivalent to whatever degree may be required to prevent weathervaning instability. Small changes of the direction of the thrust of the powered units may be readily applied, either by manual piloting or automatic controls not described, to prevent swinging oscillations of the body during hovering and transition.

On landing, particularly on descending at small airspeed, this weathervaning body member is free to align itself in pitch with the terrain upon which contact is made. Moreover, this pitching motion of the weathervaning body member may occur without producing any change in the lifting thrust direction and hence the contact with the ground produces no extraneous change in the aircraft behavior, since the thrust direction is produced in the powered thrusting member and is controlled relative to the surrounding air alone, essentially uninfluenced by changes of angle of the weathervaning body member.

Similarly, during landings and take-offs in wind, a sufficient component of thrust is inclined into the wind to balance the drag reaction due to the wind and the take-off and landing operations are otherwise but little different from operations in still air.

By these devices occupants in the weathervaning body member remain at all times in attitudes close to the normal, that is, above a level floor, or above a floor that tilts with the ground on which the aircraft rests, or which faces in a direction toward which the aircraft is moving with considerable speed, and at all times having unobstructed piloting visibility. The pilot exercises a simple and direct control over the aircraft by controlling all powered thrusting members, which in a sense are always flying, either in an airstream due to relative motion of the aircraft through the atmosphere or in a reaction stream generated by their own power plants.

The aerodynamic form of the aircraft as a whole produces directional stability in a conventional manner, by means of vertical tail surface area or its equivalent. In forms of the invention employing an even number of powered units disposed in equal numbers on either side of the vertical plane of symmetry of the aircraft, rolling and yawing control for the aircraft as a whole is accomplished by aerodynamic adjustments of the relative amounts, positions and directions of the thrust on the two sides of the aircraft. The adjustments of thrust are accomplished typically by changes of the aerodynamic pitch of the propeller blades or by changes in position of aerodynamic split flaps to shift the net thrust toward one side of the aircraft in an otherwise symmetrical power system.

Preferably aerodynamic planing area is incorporated in each free-flying powered thrusting member. This area is aligned edgewise close to the direction of the thrust axis. When translational speed exists this area produces planing reactions in the manners of wings and ailerons, to add to the sustentation force and rolling moments.

Similarly the non-powered body member may employ fixed position wing-like planing surfaces aligned to produce lift during translational flight, thereby adding to the lift of the planing surfaces just mentioned, and allowing the thrust to align more closely to the horizontal to achieve high speed.

The amount of total planing area so provided on the aircraft is preferably made sufficient to assist materially in the transitions between hovering flight and forward-moving planing flight, that is, sufficient to supply through planing lift the loss of the vertical component of thrust accompanying the forward tilt of the thrust resultant. In this way, the planing surfaces are available for conventional gliding and emergency landings in the power-off condition. When planing surfaces are employed on the non-powered body portion of the aircraft, the center of gravity of the body lies not only below but also slightly behind the pivot axis, so that it hangs on the axis in a nose-up planing attitude at slow airspeeds, producing a lifting angle on its planing surfaces which decreases through the action of the horizontal tail as speed increases.

Preferably the powered thrusting members employ their planing surfaces to conduct the powered propulsive reaction streams directly to the aerodynamic control surfaces, specifically the elevators and trim tabs which react with this flow to govern the pitching attitudes of these members, without unnecessarily exposing these propulsive streams to the ambient airstream and other extraneous influences surrounding the aircraft. This is accomplished by employing power systems which convey the propulsive reaction stream into an inlet, then through the propulsive mechanism, and then to a pitch controlling elevator such a ducted power system may consist typically of (1) an engine-driven propeller enclosed in a circumferential shroud or may consist of (2) a turbojet engine. Either of these versions, in the terminology of this application, contains a "powered propeller." Freedom from trouble is assured when in addition the outlet may be kept sufficiently clear of the ground to avoid local flow interference effects, and when there are no other aircraft surface areas which can be touched by the slipstream which are capable of influencing the thrust direction. These desirable conditions are made possible by this invention. If any reaction on the non-powered member caused that member to pitch, this could not cause the thrust direction to change, because of the free pivot between the two parts.

The axis of the transverse pivot passes through the powered thrusting member in its forward portion, specifically at a point forward of the most forward position of the effective aerodynamic center of the thrusting member, now seen in its function as a pivoted planing member. By the term "effective" aerodynamic center is meant the resultant net aerodynamic center of the entire pivoted planing member when in position and operative on the aircraft, including any effects such as those due to flow interferences, propellers, nacelles, vanes and surfaces of any sort, thereon, including any such surfaces which change positions of relative alignment with other surfaces with changes of aerodynamic angle of attack, such as relative angle changes due to airflow or mechanical linkage or both.

To accomplish alleviation of aircraft accelerations normal to the plane swept out by the transverse pivot moving in the flight direction, the use of pivoted planing surfaces as described above which constitute the major portion of the lift-producing planing area, and which produce more lift than their weight is beneficial. Specifically, alleviation of vertical gusts due to atmospheric turbulence is accomplished in horizontal flight as follows: Consider the vertical components of forces acting on the pivoted planing member. Two of these components, the weight-acceleration vertcal force acting at the center of gravity of the planing member and the vertical shear reaction from the pivot, may be considered to combine into a single resultant, which may be called resultant R. By design, resultant R is made to act downwardly in level flight at a point forward of the eeffctive aerodynamic center of the pivoted planing member, so that the lift component combines with this downward resultant R to yield a nose-down couple acting on the pivoted member. This couple is balanced by an equal and opposite couple accomplished by the use of negative aerodynamic incidence on the more rearward planing surfaces which are referred to herein as "trimming surfaces" as distinct from the more forwardly lying planing surfaces which are referred to as "lifting surfaces." This is accomplished by the use of trailing edge or downstream surfaces inclined relatively upwardly toward their trailing edges. Then in a gust, any change of angle of attack causing a change of lift causing in turn a corresponding change in resultant R, produces a change of pitching moment, always in a direction to change the angle of attack and lift toward their original undisturbed values. That is, an upward gust increases the aerodynamic angle of attack, increases lift, increases R and increases the nose-down couple on the pivoted unit, thereby decreasing the angle of attack, lift, and R. In net result, the pivoted planing unit weathervanes to eliminate the change of angle of attack and tends to maintain its lift near a constant value, as determined by the trim tab setting and the speed. The balancing couple due to the negatively inclined aerodynamic trimming surfaces does not change when the angle of attack changes, as is well known.

This gust alleviation action materially reduces the peak accelerations and stresses and improves the riding comfort of the aircraft in all natural gusts, which can never have theoretically sharp velocity gradients. Its action exceeds that due to static stability in a conventional airplane because the pivoted feature permits the use of a planing system having relatively large aerodynamic static stability and relatively small pitching moment of inertia, producing correspondingly small pitching lag in the pivoted units as they weathervane automatically to maintain a constant angle to the relative wind. The action also influences the pilot's elevator stick force per g, relatively increasing this quantity when the alleviation is increased, by actions readily apparent to a person versed in the aerodynamics of control and stability.

During transition and planing flight each pivoted thrusting member and each pivoted body member behaves in a manner analogous to a free flight airplane, so far as pitching stability, trim, and control are concerned, altered by the static and dynamic normal shear reactions introduced by the transverse pivot connection to the rest of the aircraft. The "free-flying" powered and controlled thrusting members combine with the non-powered body member to form a dynamic system which is determinate in its aerodynamic and aeroelastic behavior in accordance with established methods of analysis. The forces and moments on the units may be altered by springs in the pitching control system or acting around the main transverse pivot, by elevator controls, by trim tabs, or by aerodynamic form to obtain desirable trim speeds, trailing tendencies and aerodynamic control forces. The results may be analyzed by considering each pivoted member separately, including the transverse pivot reactions. The trim and stability characteristics of the total aircraft are derived in turn from those of the pivoted units, and may be tailored to obtain the characteristics particularly desired.

Now proceeding to the figures a specific form of the invention is shown. Two powered thrusting members 1 pivot around transverse axis 15 formed by transverse horizontal pivot member 2 mounted in a non-thrust-producing weathervaning central body member 3. Rotations of the two thrusting members 1 and of body member 3 around axis 15 are all independent of each other. See FIGURES 1, 2, and 4.

Figure 1:
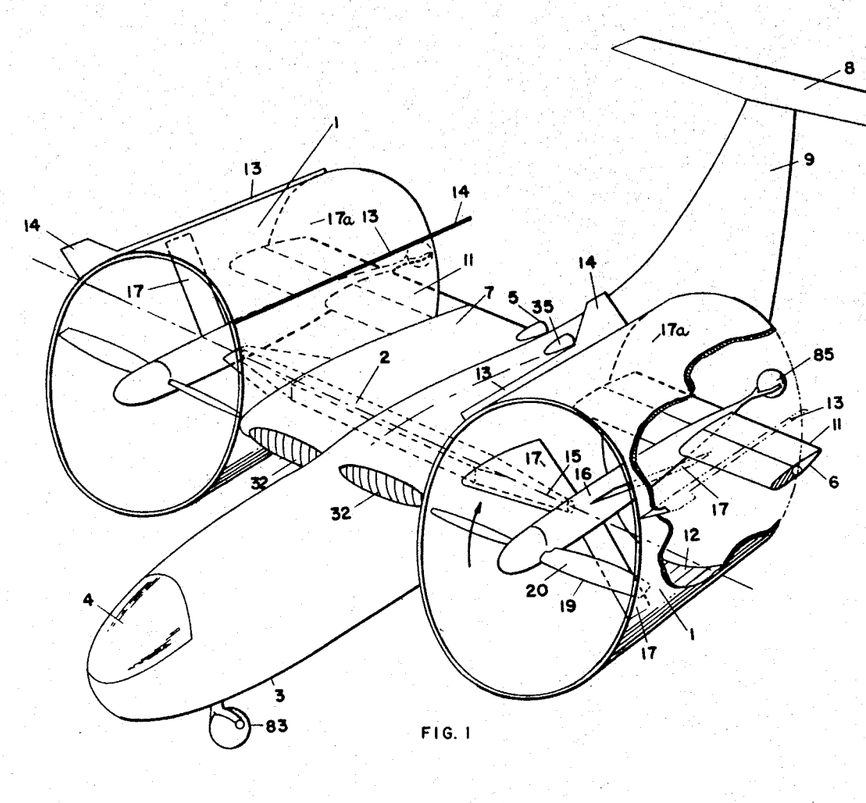
FIGURE 1 is a perspective view of an aircraft embodying the invention.
Figure 2:
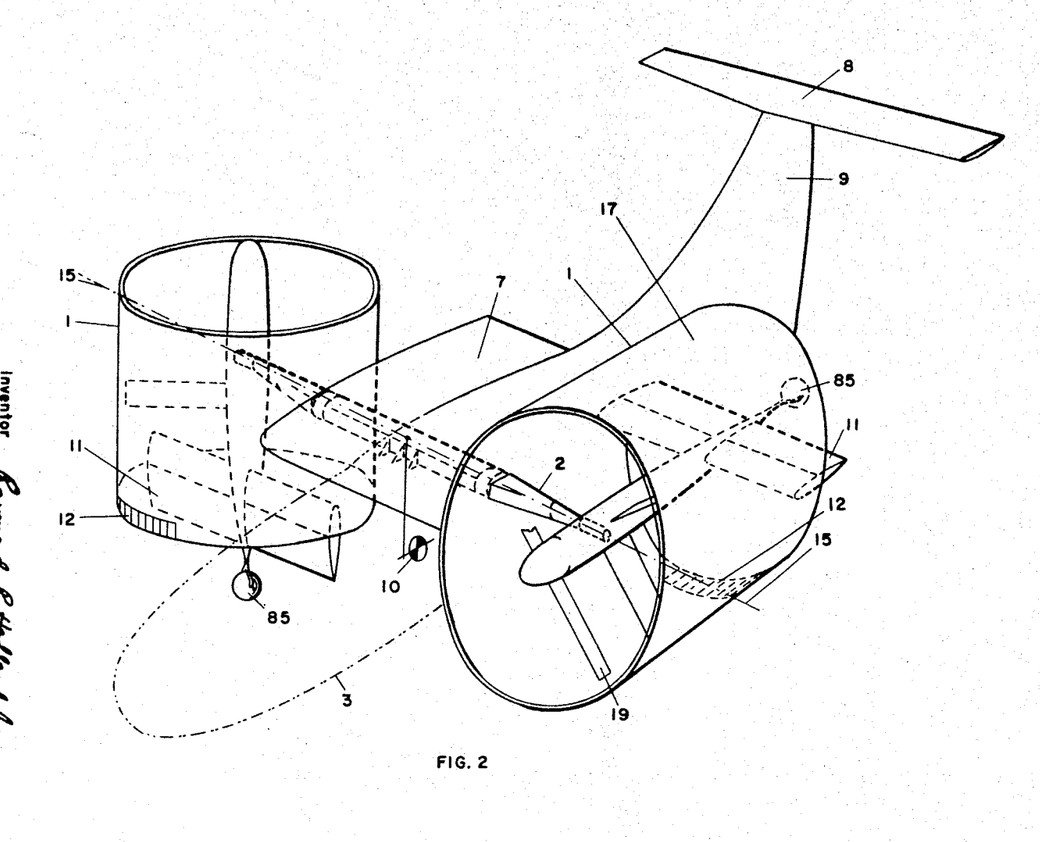
FIGURE 2 is a partially diagrammatic perspective view showing elements of the aircraft, including a weather-vaning central body member and two laterally arranged powered thrusting members, aerodynamic planing surfaces incorporated into these members, and a pivot member connecting these members.

Powered thrusting member 1 takes various positions around transverse axis 15 according to the aerodynamic and weight moments applied to it (FIGURES 1 and 2). Propeller 19 operates within annular wing 17a, forming a disk when whirling which fills a full circular cross section of the annulus, and thereby, under all flight conditions, unerringly drives a propulsive reaction stream across elevator 11 which cooperates reactively with this stream. This elevator is controlled in pitch relative to thrusting member 1 by the pilot through elevator actuating system 6 (FIGURE 4) to change its angular position in pitch relative to the propeller airstream, causing thrusting member 1 to rotate in pitch by driving the rear portion of member 1 upward or downward (or forward or rearward) as required. When member 1 faces upwardly it thrusts upwardly. If member 1 is made to pitch forwardly a forward component of thrust is produced. A relative wind is produced by forward motion of the aircraft which tends to pitch members 1 more nose-downwardly. This pitching tendency may be resisted and reversed by elevator 11, or the process may be continued with the aircraft gaining progressively in forward speed and member 1 reaching a smaller angle of attack more effective for lifting, until it develops sufficient planing lift in addition to that acting on planing surfaces 7 (attached rigidly to body member 3) to support the aircraft.

Elevator 11 has a strong influence on the airstream which passes internally through member 1 and is therefore an effective control during all powered flight conditions and during fast non-powered flight. It has little influence on the static aerodynamic stability of member 1 since that is governed principally by the external airstream, the flow directions of which are not guided so positively as is the airstream which passes internally through member 1.

The effective aerodynamic center of the fixed position planing surfaces 17 and 17a, elevator 11, trim tabs 12, nacelle 16 and propeller 19 lies toward elevator 11 from axis 15. When member 1 faces upwardly and drag forces act on it due to forward motion, pitching moments are produced acting on member 1 to pitch its inlet face forwardly. Similarly, in planing flight when member 1 is near a horizontal position facing forward, lift forces act upwardly rearward of the pivot acting to pitch member 1 nose downwardly. These moments are opposed principally by aerodynamic moments. Dihedral fins 14 (FIGURE 1) produce a nose-up pitching moment, the strength of which is a function of the strength of the induced three-dimensional flow field around the aircraft in planing flight. Trim tabs 12 are manually adjustable in flight by conventional means to produce a nose-up aerodynamic pitching moment to cause member 1 to trim as a freely pivoted non-controlled aerodynamic body. They can be adjusted to produce trim at any desired condition of power, aircraft weight and flight speed. Tabs 12 are located in a region where the flow never stalls during powered flight, with one side exposed to the propulsive reaction stream and the other side exposed to the free flow on lower (sometimes forward) surfaces of member 1 at the trailing edge.

Figure 4:
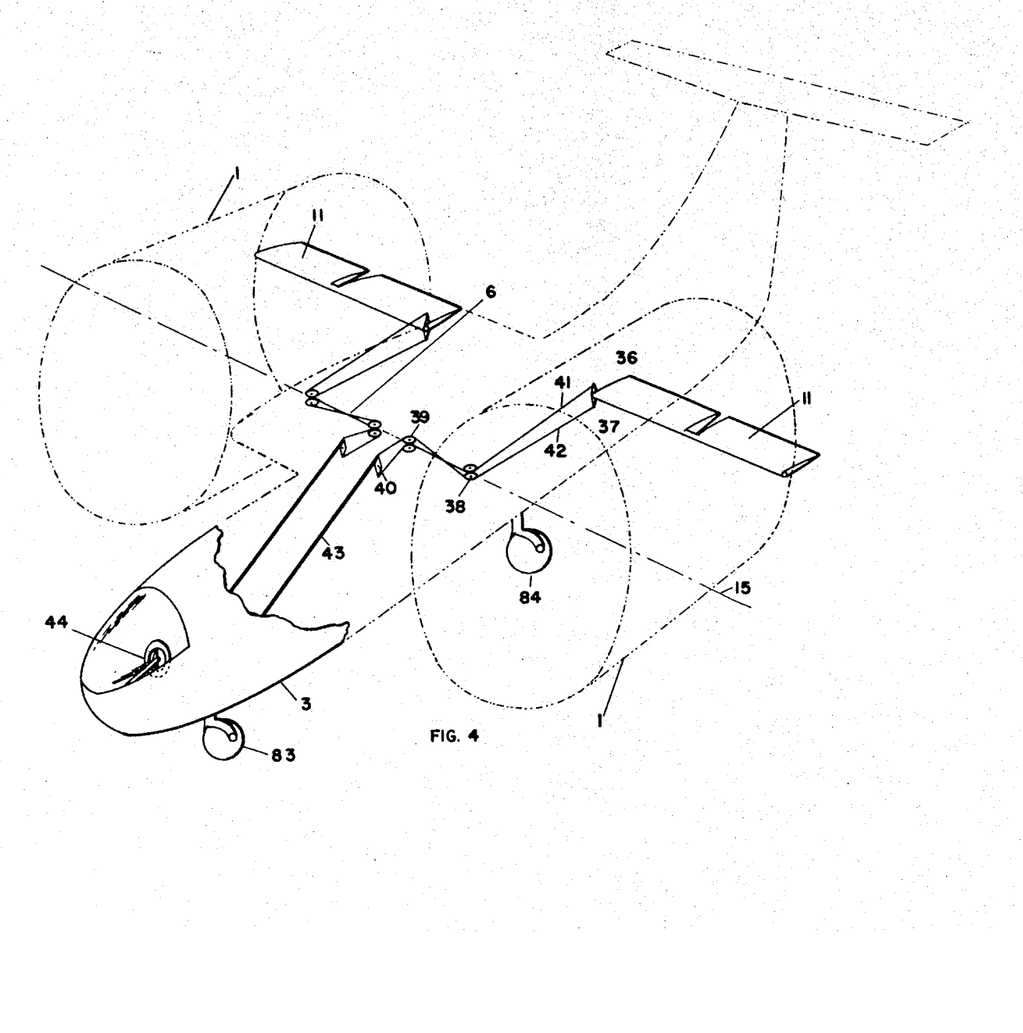
FIGURE 4 is a partially diagrammatic perspective view showing the piloted actuating mechanism which operates the two elevators which steer the powered thrusting members in pitch, and thereby steer the whole aircraft.

Body member 3 (FIGURE 2) rotates relatively nose-up and nose-down in space around axis 15 as caused by the action of its center of gravity 10 (which is located beneath and slgihtly rearward of pivot axis 15 when body 3 is horizontal), by aerodynamic pitching moments due in part to the external form of the body but principally due to horizontal tail surface 8 which is rigidly attached near the rearward extremity of body 3, and by ground reactions on landing wheels 83 and 84 (FIGURE 4). Tail surface 8 produces a major weathervaning action of body 3 about axis 15, at high speed causing the pilot's forward line of vision to face in the direction of translational movement through the air, and at low speeds to incline toward the direction of movement, for instance, rising above the horizontal in vertical ascent and dropping beneath the horizontal in vertical descent.

Powered thrusting member 1 consists (FIGURE 1) of propeller 19 and its driving shafts and mechanisms, nacelle 16, elevator 11, trim tabs 12, aerodynamic planing surfaces 17 and 17a, flow stabilization ridges 13 with dihedral fins 14 at the forward end of the outboard ridge and at the rearward end of the inboard ridge, landing wheel 85, and additional parts of power plant 5 (FIGURE 3) and elevator actuating system 6 (FIGURE 4) separately described below.

Annular planing surfaces 17a (FIGURE 1) serve as a circumferential ring for propeller 19, and substantially flat planing surfaces 17 serve as fairings for the structural supports for that ring, fairing for the outboard end of pivot member 2, and as aerodynamic straightening vanes to reduce axial rotation in the propulsive reaction stream from propeller 19. All surfaces 17 and 17a within the same thrusting member 1 have fixed positions relative to each other, and have airfoil shapes for their fore-and-aft cross sectional forms. They produce lift during forward flight when powered thrusting members 1 are tilted nose-up. During fast flight the thrusting members are only slightly nose-up relative to the flight direction, thereby permitting nearly full propeller thrust to act to overcome aerodynamic drag, with planing surfaces 17, 17a and 7 (rigidly attached to body member 3) producing the necessary sustaining lift.

The arrangement of planing surfaces 17a in the form of an annular planing member around the propeller (FIGURE 1) forms a ducted passage enclosing the propulsive reaction stream. This accomplishes more static thrust per unit diameter and per unit power than would be achieved were the propeller exposed, reduces propeller stresses by reducing the angularity of airflow entering the propeller disk, reduces the disturbances to the aircraft due to such flow angularities, and protects personnel and surrounding objects from the dangers of being struck by a propeller blade. Use is made of a long chord on the ring is to move the effective aerodynamic center of the combined planing surfaces 17 and 17a downstream from pivot axis 15, as required for aerodynamic static stability, to conduct the propulsive slipstream through a ducted passage to elevator 11 under controlled flow conditions while maintaining a long moment arm from pivot axis 15 to elevator 11, to obtain adequate planing area for power-off gliding and emergency landings, and to produce a planing area of relatively low aspect ratio on members 1 with advantages of being able to plane at a relatively high angle of attack prior to stalling.

The axle of wheel 85 (FIGURES 1 and 2) is parallel to axis 15 to permit freely controllable rotations of unit 1 about axis 15 even when the wheel is resting on the ground. Wheel 85 is mounted on a long stroke strut with a light spring rate to facilitate lateral leveling of the aircraft by means of its flight controls when it is resting on ground which is not level laterally.

Flow stabilization ridges 13 (FIGURE 1) are fixed position aerodynamic surfaces which are long in the direction of flight, low in height, attached rigidly to the upper exposed surface of the annular planing surfaces around propeller 19, standing normal to that surface, and sharp along their free edges. Ridges 13 stabilize the onset, progression and extent of separated airflow on the external region of planing surface 17a lying between them when that area is steeply inclined and in a downstream position during forward motion at the slower speeds. They cause the movement of the center of lift during the stall transition to be more regular, improving the regularity of the elevator control forces required for pitching trim in passing through that regime. They tend to define the boundaries and produce a relative orderliness in the otherwise uncontrolled fluctuations of the separated wake. By means of their relatively sharp top edges they reduce the grain size in the shed turbulence, increasing the frequency and reducing the magnitude of the individual forces imposed on the aircraft by the disturbed wake.

Dihedral fins 14 (FIGURE 1) produce pitching moments on units 1 when a lateral component of flow velocity exists. Fins 14 are small externally exposed aerodynamic surfaces which have a large slope in a lateral direction and are located well forward on the outboard portions of members 1 and well rearward on the inboard portions of members 1 at substantial distances in horizontal component from the pivot axis of member 1, so that a sideslip to the right produces a nose-up pitching moment on member 1 on the right side of the aircraft and a nose-down pitching moment on member 1 on the left side, increasing the lift on the right side of the aircraft and decreasing it on the left side, as occurs in conventional fixed wing aircraft having dihedral. Fins 14 have substantially no incidence in the direction of flight so that they operate during planing flight in the induced flow which has an upward-inboard component of velocity in the region of the forward-outboard fins 14, and a downward-inboard component of velocity in the region of rearward-inboard fins 14, acting at both locations to produce nose-up pitching moments on members 1. They serve as an aerodynamic moment device amounting to aerodynamic camber in three-dimensional flow, acting to hold members 1 at a nose-up planing angle of attack.

Body member 3 (FIGURE 1) consists of the fuselage of the aircraft containing pilot's compartment 4 in its nose region, horizontal tail 8 and vertical tail 9 rigidly attached near its rearward extremity, castering landing wheels 83 and 84 (FIGURE 4), planing surface 7 rigidly mounted on the upper region of body member 3 forward of the tail surfaces, and set at a nose-up aerodynamic angle of attack relative to the plane of zero lift of horizontal tail surface 8, pivot member 2 mounted in the upper region of the body member, and parts of power plant 5 (FIGURE 3) and steering system 6 (FIGURE 4) which are separately described below.

Power plant 5 (FIGURE 3) consists of propellers 19 with blades 20, rotatably mounted around pivoted propeller mounting member 18, propeller blade pitch control mechanisms 21, power means powering the propellers in common, and power transmission means transmitting power to the propellers in common. These power transmission parts consist of propeller shafts 22 on which are mounted gears 23, driven by gears 26 mounted on transverse shafts 24 and 25 which lie co-axially on transverse pivot axis 15 and at the inboard ends of which are mounted gears 27, driven by gear 30 which is mounted on shaft 29 at the opposite end of which is free turbine 28. Combustion air for the power plant enters inlet ducts 32, passes into turbomachine gas generators 31, passes through turbine inlet duct 33 into free turbine 28 and exhausts through outlet ducts 35. Four engines 31 are used in the power plant so that the power loss or failure of any one engine will cause only a relatively small percentage loss of total thrust, to permit an emergency landing to be made safely. Behind each engine a backflow-check valve 34 is used to prevent reverse flow and pressure loss from this source out of turbine inlet duct 33, in the event of engine failure. The two propellers 19 are interconnected by shafting as described to produce equal rates of rotation at the two propellers at all times, to avoid uncontrollable thrust unbalance in the event of partial power failure.

Figure 3:
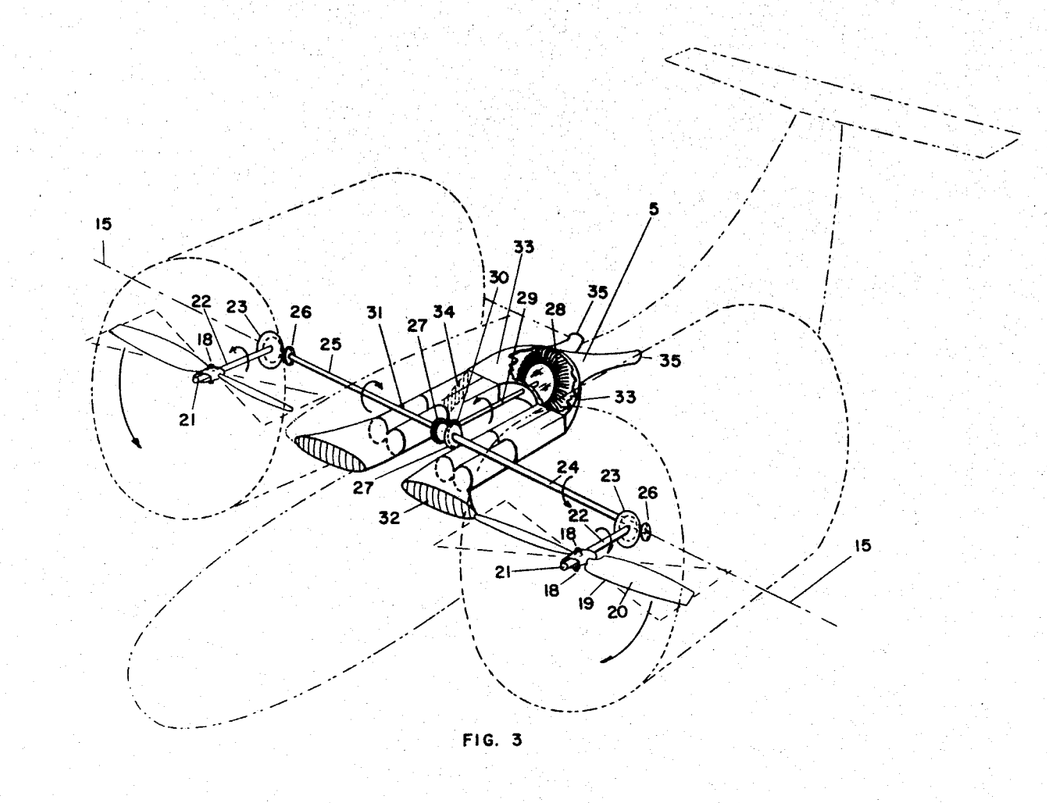
FIGURE 3 is a partially diagrammatic perspective view showing the power plant of the aircraft, including a system of shafts attached in common to both propellers to balance the thrust on opposite sides of the aircraft.

The adjustment of thrust on opposite sides of the aircraft is by means of blade pitch control mechanism 21 actuated to obtain differential control of the aerodynamic angles of propeller pitch of blades 20 by means of push rods 61 described below.

On each propeller 19, blades 20 are mounted rigidly in the propeller hub except for the conventional ability to change pitch, and the hub is pivoted on pivoted propeller mounting member 18, the axis of which lies normal to the line of the long axis of the blades and normal to the axis of spinning rotation (shaft 22). This gives the aerodynamic elements of the propeller (blades 20 in combination) a freedom to tilt bodily forward at one tip and rearward at the other, creating aerodynamic forces which neutralize gyroscopic forces which would otherwise produce rotation of member 1 around axis 15, or which would introduce the need for additional mechanism to prevent such rotation, and which would then introduce stresses and additional weight in the structure.

Shafts 24 and 25 lie on transverse pivot 15 to permit rotation of propellers 19, shafts 22 and gears 23 around shafts 24 and 25 and simultaneously around pivot 15 which is the axis of rotation of all parts of the pivoted power member 1. Power plant 5 is symmetrically arranged about the central plane of the aircraft except that shafts 24 and 25 are of different lengths in order to cause one of gears 26 to be inboard of its meshing gear 23 while the opposite gear 26 lies outboard of its gear 23, to cause opposite propellers 19 to turn in opposite directions. The power transmission in succession through gears 30 to 27 and 26 to 23 permits the high speed of turbine shaft 29 to be reduced to a relatively slow speed of propeller shaft 22 in the process of power delivery.

Steering system 6 (FIGURE 4) contains only two aerodynamic control surfaces, specifically elevators 11, and it contains the internal actuating system by means of which the pilot operates these two elevators, and by means of which the pilot controls the propeller pitch, in order to adjust the thrust. The operation of the cockpit steering control 44 operates push rods 43, acting on bell cranks 40, to which are attached cables 41 and 42 which pass around pulleys 39 and 38, attaching to elevator horns 36 and 37 on control surfaces 11. Cables 38 and 39 are arranged to run in a transverse direction generally along axis 15 between pulleys 39 (which are mounted in the free-weathervaning central body 3) and pulleys 38 (which are mounted in the independently rotatable power member 1), in this way keeping to small values any angular deflection of control surfaces 11 relative to powered thrusting members 1 caused by the change of position of power members 1 about axis 15 relative to body member 3. The portions of cables 41 and 42 lying between pulleys 38 and 39 form a torsionally yielding construction lying along axis 15 such that the angular position of elevator 11 relative to member 1 is unaffected by relative angular displacements in pitch between member 1 and body member 3. Elevator 11 is changed in angular position relative to member 1 only when cockpit steering control 44 changes position relative to body member 3.

In pilot's control mechanism 44 (FIGURE 5) vertical member 64, pivoted at its lower end in bearings 68 (which are anchored in the aircraft structure at base 69) and extended at its upper end by means of vertical spindle 62 and pivoted at pivot 51, forms one side of a parallelogram. Member 54, pivoted universally at its lower end at pivot 55 (which is anchored to the aircraft structure at base 56) and universally pivoted at its upper end at pivot 52, is the opposite member of the parallelogram. By means of this parallelogram the hub of wheel 45 is prevented from moving vetrically.

Figure 5:
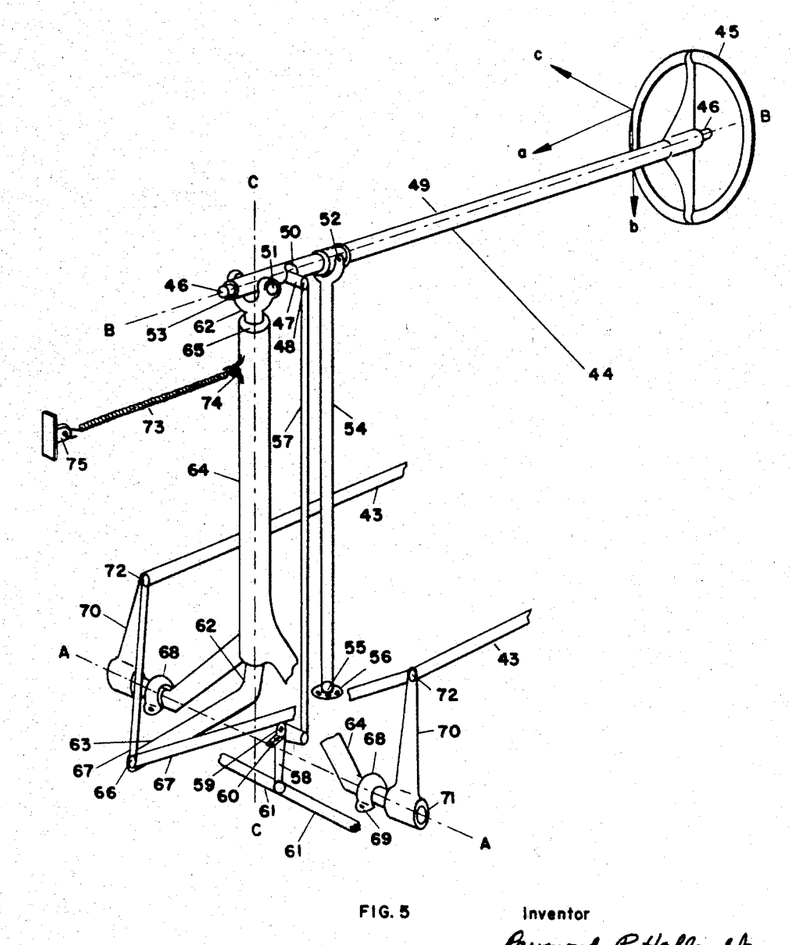
FIGURE 5 is a perspective view showing the pilot's steering mechanism.
Figure 6:
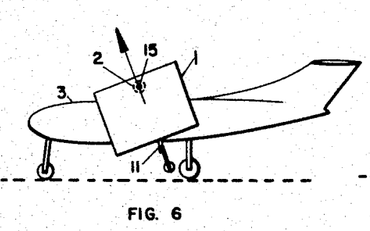
FIGURE 6 is a diagrammatic side view showing the direction of the thrust with the powered thrusting members in position for slow taxying or for holding a spot position against a wind when taking off vertically, landing vertically or hovering, or for starting transition from hovering to forward flight in still air. The position of the surface of the ground, which is applicable in some of these conditions and not applicable in others, is shown by a broken line.
Figure 7:
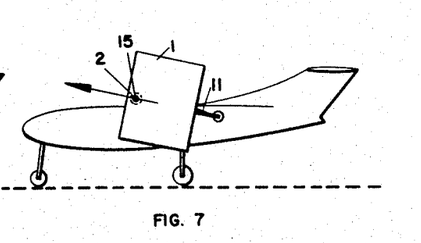
FIGURE 7 is a diagrammatic side view showing the powered thrusting members in position for fast taxying, for take-off run, for glide landing, for the portion of the transition from hovering to high speed approaching high speed, and for extended taxying with partial power, for instance in moving slowly over rough terrain or along a highway.
Figure 8:
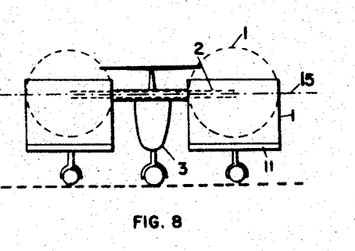
FIGURE 8 is a diagrammatic front view showing the powered thrusting members in solid line in position for vertical rising and descending and for hovering in still air, and in dotted lines in position for high speed planing.
Figure 9:
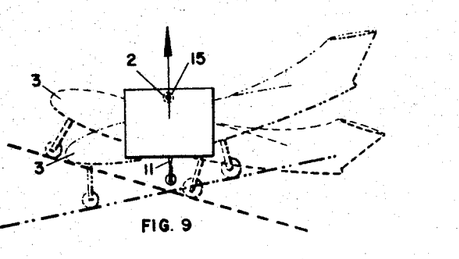
FIGURE 9 is a side view showing the powered thrusting members holding a position for vertical thrust, with the body member taking a nose-up position in rapid vertical climb or when landing facing uphill on sloping ground, and taking a nose-down position when descending rapidly in a vertical direction or when resting on ground which slopes down to the front.
Figure 10:
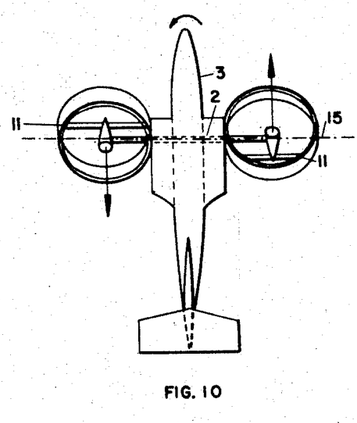
FIGURE 10 is a view as seen from above showing the powered thrusting members in positions to swing the nose of the aircraft toward the pilot's left when hovering, taxying, or standing on the ground.
Figure 11:
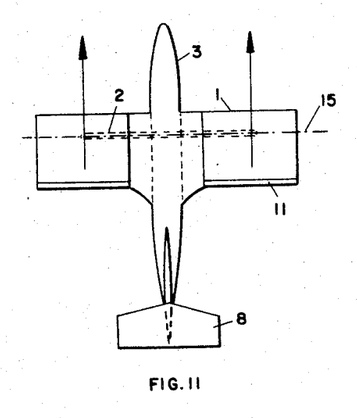
FIGURE 11 is a view as seen from above showing the powered thrusting members in positions for high speed planing flight.

Movement of wheel 45 in the direction of arrow $a$ causes rotation of levers 70 around axis A—A. Forward movement of wheel 45 rotates member 64 around bearings 68 carrying vertical spindle 62 in rotation around axis A—A so that the pivoted front end 66 of its forward projecting arm 63 moves forwardly and downwardly, carrying linkage rods 67 with it, thereby rotating the pivoted upper ends 72 of levers 70 forward around axis A—A. This translates push rods 43 forwardly deflecting the trailing edges of elevators 11 (FIGURE 4) downwardly.

Rotation of wheel 45 in direction $b$ around axis B—B rotates shaft 46 within hollow shaft 49 on thrust bearing 53 and raises pivot 48 at the outer end of lever 47, carrying with it rod 57, which operates bellcrank 58 around pivot 59 (which is anchored rigidly to the aircraft structure by mount 60) causing rods 61 to move laterally toward the pilot's left acting on propeller pitch mechanisms 21 to increase the pitch and thrust of blades 20 on the left hand propeller 19 and decrease the pitch and thrust correspondingly on the right hand propeller.

Sideward movement of wheel 45 rotates vertical spindle 62 in bearings 65 around axis C—C and carries the forward extending arm 63 sideward causing pivot 66 to act on bias rods 67 causing levers 70 to rotate oppositely on bearings 71 relative to member 64, and causing push rods 43 to translate oppositely, deflecting elevators 11 oppositely. When wheel 45 moves to the right, in the direction of arrow $c$, pivot 66 moves to the left, the left hand rod 43 moves rearward, the left hand elevator 11 moves trailing edge upward, and right hand elevator 11 moves trailing edge downwardly.

Pilot's control 44 can be operated through small movements with one hand, obtaining universal flight steering at all flight attitudes and speeds between hovering and dive speed. It is only necessary in moving wheel 45 fore and aft to apply the control force at the rim of the wheel toward axis C—C to avoid obtaining a rotation of the system about axis C—C, which would be evident as a sideward movement of the wheel. The system is suitable for obtaining light control forces, which are favorable for avoiding unintentional sideward movements of wheel 45.

Pilot's control unit 44 (FIGURE 5) is equipped with elevator downspring 73 attached in tension to member 64 at pivot 74 and to the aircraft structure at pivot 75. It acts in a direction to depress the trailing edges of elevators 11, and to hold the wheel forward in the cockpit when not in use. It requires a continuing rearward pull on the wheel as forward aircraft velocity decreases, as the airspeed across elevator 11 decreases and as the aerodynamic hinge moments on that surface decrease, and it produces a tendency of the aircraft to seek faster speeds, requiring the pilot to hold it back deliberately whenever hovering is desired, in a manner similar to an airplane which is statically stable down to its slowest flying speeds.

The aircraft of this invention is controllable by movements of the pilot's control 44 which are consistent with the response of the aircraft whether the aircraft is on the ground, hovering, flying fast or flying at transition speeds. When wheel 45 is moved forward, the trailing edges of elevators 11 move downward (or forward if the propeller axis of member 1 is vertical) causing members 1 to pitch nose downwardly. During hovering this action initiates forward movement of the aircraft. At high speeds it causes the aircraft to start a dive. When wheel 45 is rotated clockwise as seen by the pilot facing forward, the pitch of the left-hand propeller 19 is increased and the pitch of right hand propeller 19 is correspondingly decreased. The hovering aircraft is rolled clockwise, in the same sense as the wheel rotation. If the airplane is flying fast, with the powered units 1 near horizontal the aircraft swings its nose toward the right, and rolls to the right. When wheel 45 is displaced bodily to the pilot's right, elevator 11 on the right side deflects trailing edge downwardly and elevator 11 on the left side deflects trailing edge upwardly in a manner analogous to servo tabs (the elevators) acting on large ailerons (the pivoted thrusting members). Thus the powered thrusting member 1 on the right pitches nose downwardly and powered thrusting member on the left pitches nose upwardly. If the aircraft is hovering, with thrust members 1 facing vertically upward, this action tilts the thrust resultant from the right hand member 1 forward from the vertical and tilts the thrust from left hand member 1 rearward from the vertical, creating a yawing moment which swings the nose of the aircraft around toward the pilot's left, a rotation in the same sense as the rotation of wheel 45 and its shaft around the forward-lying axis C—C (FIGURE 5). In fast flight, with thrust members 1 near the horizontal a movement of wheel 45 to the right operates on elevators 11 as described above and rolls the aircraft toward the right, that is, right side downwardly. All movements of the control wheel reverse to those described produce reverse directions of reaction on the aircraft.

At airspeeds intermediate between hovering and high speed the aircraft's responses to control movements are transitional to those described above. The push-pull control of the wheel never changes; a forward wheel motion produces forward aircraft movement, and a rearward pull halts that movement. The thrust axes rotate between the vertical for hovering and the horizontal for high speed, during which time planing lift is progressively developed. The rotation of the pilot's wheel to the right rolls the aircraft to the right at all times, a circumstance of the fact that as soon as surfaces 17 and 17a of members 1 begin to develop planing lift in forward flight the differential control of thrust on the two sides of the aircraft also controls the lift differentially in the same sense. Thrust and lift both increase on one side of the aircraft and they both decrease on the opposite side of the aircraft. This rolling control weakens as planing speed continues to increase and a yawing tendency accompanies it, caused by the direct action of the change of thrust on the two sides of the aircraft. This yawing action during planing flight causes the rolling control to operate as the turning control, at which time the aircraft is steered like a car, and banks its curves in the correct direction. To obtain more or less bank in high speed flight, the wheel is moved laterally sideways as though it were the top of a conventional stick control. The response to this sideward movement of the wheel changes progressively as forward speed develops. On the ground and during hovering its action is like steering a bicycle, except that the handle bars are replaced by a rearward extending shaft terminated by a hand grip having the form of a wheel. At that time movement of the wheel to the right causes the aircraft to face more to the pilot's left. As forward speed develops this same action starts lowering the right side of the aircraft as well as causing the aircraft to yaw toward the left. At high speeds the yawing response toward the left has disappeared and only the rolling to the right remains.

In the hovering condition, which is usually considered to present more problems than high speed control, the rotation of the cockpit control around axes A—A, B—B, and C—C respectively produces aircraft rotations about respectively parallel axes, and always in the same directions, producing a simple and correct response.

In the usual vertical take-off, units 1 are controlled so as to avoid any yaw or roll of the aircraft, thrust is increased and the aircraft climbs straight up, with the fuselage raising its nose slightly as the front wheel leaves the ground first. When sufficient elevation has been gained, the aircraft is yawed to face toward the flight destination, the control wheel is moved gradually forward, forward speed is gained, and thrusting members 1 come nose down near a level position. During this time the fuselage stays nearly level, although members 1 move through an angular range sometimes exceeding ninety degrees. If the aircraft displaces in roll during hovering so that it is not level, it starts moving sideways toward the low side, yawing to face toward its direction of motion due to the weathervaning action of vertical-tail surface 9. In this way, the wheel control may be used to roll and turn the aircraft toward the desired flight direction, even from hovering.

In cruising, the plane as a whole is kept aligned tangent to its flight path by the action of vertical tail surface 9. Body 3 is kept aligned in pitch to the flight path by horizontal tail surface 8. The aircraft is controlled in climb and dive by increasing and decreasing respectively the angle of attack of members 1, through the action of elevator 11, with both members moving together. The aircraft is made to roll by increasing the angle of attack of member 1 on one side and decreasing the angle of attack of member 1 on the opposite side. In cruising flight, power may be cut, propellers feathered, and the aircraft may be flown in a glide by means of elevators 11. In power plant emergencies the aircraft may be glided to a conventional rolling landing on a runway by the use of the two elevators 11 alone.

To reduce speed from cruising flight power is reduced or the airplane is made to climb. When speed has dropped so low that planing alone with units 1 nose-up near their stalling angles cannot develop adequate lift, power is increased. This increases the lift on the pivoted thrusting members, prevents the stall of internal surfaces, and provides the ability otherwise lacking in elevator 11 to turn members 1 on up to angles of attack steep enough to stall fully the upper external surfaces lying between flow stabilization ridges 13 and achieve vertical thrust. The powered flow internal to units 1 sustains both lift and control in a positive manner. Any disturbed external flow behind units 1 passes beneath horizontal tail 8. The aircraft loses speed until it reaches hovering flight, with units 1 facing vertically upward, controlled in that position by elevators 11, and with body 3 hanging in a slight tail-down attitude beneath axis 15. Reduction of power allows the aircraft to settle to the ground.

Thrusting members 1 may be rotated by the action of elevators 11 to taxi the aircraft forward, backward, pivot it around a fixed point on the ground, taxi at high speed forward with and to make a high speed running take-off like a conventional airplane if that is desirable for any reason, such as for taking-off with an overload.

In the hovering landing, not only can the aircraft descend vertically into a restricted area without risk of its propellers striking surrounding objects, but it may land on a sloping surface. It is controlled by yawing to touch down on terrain which is level laterally. The body 3 then rotates freely to conform to the fore and aft slope of the terrain upon contact.

Figure 12:
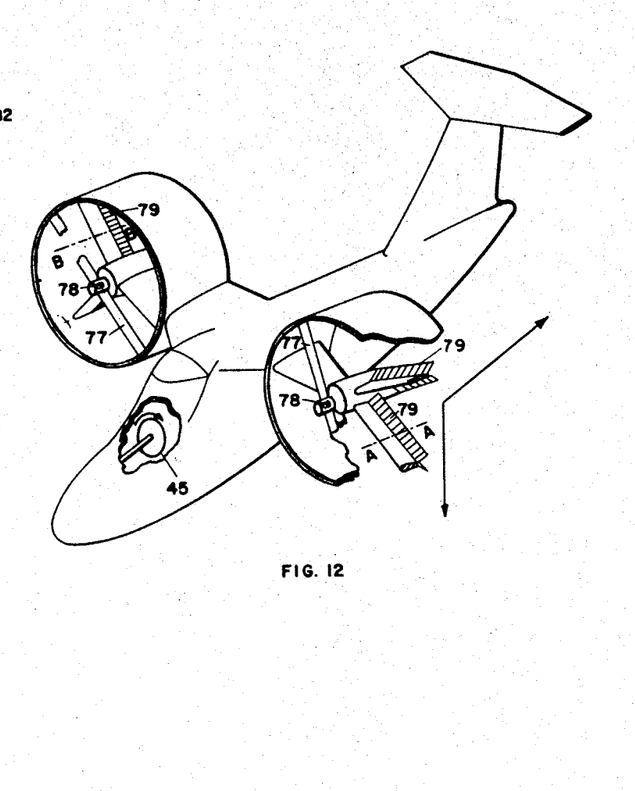
FIGURE 12 is a perspective view of one version of the aircraft in planing flight showing the incremental forces which act on the aircraft to yaw it and roll it to start a banked turn to the pilot's left when the top of the pilot's control wheel is turned to the left relatively decreasing the net thrust and the lift on the left side of the aircraft, accomplished by the use of aerodynamic split flaps behind the propeller, which act directly to adjust thrust and indirectly to adjust lift.
Figure 13:
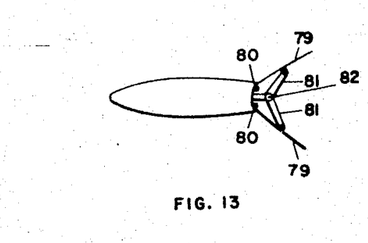
FIGURE 13 is section A—A from FIGURE 12 showing the aerodynamic split flaps in the open turbulence-producing position, used for decreasing thrust.
Figure 14:
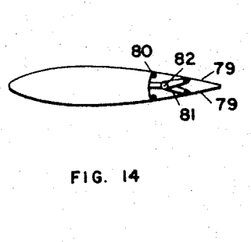
FIGURE 14 is section B—B from FIGURE 12 showing the aerodynamic split flaps in the closed clean position.

For development and initial demonstration of the invention and for low cost versions a simple constant pitch propeller 77 is shown installed in FIGURE 12. On propeller 77 both blades rock as a unit through small angles around pivot 78 the rotational axis of which is perpendicular to the plane containing the long dimension of the blades and the axis of the hub. Differential adjustment of thrust on the two sides of the aircraft is provided by aerodynamic split flaps 79 actuated to open for net thrust reduction by rotation around hinge lines 80 actuated by V-rods 81 driven laterally at their joined forward ends by push rods 82 moving parallel to hinge lines 80 and actuated by push rods 61 in a conventional manner. These parts operate to produce control results equivalent to those of the controllable pitch propeller. This version of the aircraft also employs aerodynamic elevators 11 which are omitted from FIGURE 12 for the sake of clarity.

I claim:

1. An aircraft including a body member, a powered thrusting member pivotally attached to said body member on a horizontal axis transverse to the flight direction of said aircraft, a ducted passage through said thrusting member, a powered propeller mounted within said passage operating throughout a full cross section of said passage driving air rearwardly through said passage, pilot-operable aerodynamic means for adjusting the thrust attached to said thrusting member, an aerodynamic elevator member hingedly attached to the rearward region of said thrusting member, pilot-operable actuating means attached in said body member and attached to said elevator member, said actuating means having a torsionally yielding portion adjacent to said horizontal axis between said body member and said thrusting member, said actuating means controlling said elevator member in angular relationship to said thrusting member independently of the angular position of said body member relative to said thrusting member, said elevator member reactively co-operating with the propulsive reaction stream of said powered thrusting member rotating said thrusting member in pitch, as described.

2. An aircraft comprising a body member, a pivot member attached to the upper region of said body member with its axis extending horizontally transverse to the flight direction, a planing member freely pivoted on said pivot member at the side of said body member, an elevator member attached to the rearward region of said planing member, actuating means pilot-operable in said body member for actuating said elevator member in pitch, said actuating means joining to said body member, passing through said planing member and joining to said elevator member, said actuating means having a portion close along the axis of said pivot member between said body member and said planing member, which portion yields torsionally when said body member rotates in pitch relative to said planing member, meanwhile said elevator member remaining in fixed position in pitch relative to said planing member and said actuating means remaining in fixed position relative to said body member, whereby pilot-actuated changes of position of said elevator relative to said planing member are independent of the relative positions in pitch of said body member and said planing member.

3. In an aircraft a central body member, a horizontal tail surface member and a vertical tail surface member attached to said body member near its rearward extremity, pivot means attached horizontally and transversally to said central body member forward of said tail surface members, powered thrusting means pivotally attached to said pivot means, said thrusting means including thrusting members on laterally opposite sides of said body member, planing surfaces attached to said thrusting members, pilot-operable aerodynamic means attached to said thrusting members adjusting the magnitude of the thrust of each of said thrusting members, pilot-operable aerodynamic means mounted on said thrusting members controlling the angular position in pitch of said thrusting members independently of the angular position in pitch of said central body member, power means mounted in said aircraft powering said thrusting members, and power transmission means attached to said power means passing through said central body member attached at each of its laterally opposite ends in each of said laterally opposite thrusting members.

4. An aircraft comprising a central body member, a pivot member rigidly attached to said body member horizontally transverse to the flight direction, planing members pivotally attached symmetrically to the lateral ends of said pivot member, said planing members having freedom to pitch on said pivot member, powered propellers mounted on the forward portions of said planing members directing propulsive reaction streams across said planing members, hinged elevators attached to the rearward portions of said planing members lying in said reaction streams, pilotable actuating means attached in said body member and attached to said elevator for rotating said elevators in pitch relative to said planing members, and torsionally yielding portions in said actuating means located between said body members and said planing members in the region of said pivot member, and thrust balancing means attached in common to said propellers on opposite sides of said central body member.

5. In combination, on an aircraft, a body member, a pivot member attached to the upper region of said body member, with its axis extending horizontally transverse to the flight direction, a powered thrusting member freely pivoted on said pivot member, a pilotable elevator member attached to the rearward region of said thrusting member, a powered propeller shaft rotatably mounted in said thrusting member with its axis parallel to the flight direction, a pivoted propeller mounting member attached to the end of said propeller shaft with its axis perpendicular to the axis of said shaft, a propeller hub pivotally mounted on said pivoted propeller mounting member, and a propeller blade radially attached to said propeller hub with its long axis perpendicular to the axis of the pivoted propeller mounting member, whereby gyroscopic moments are neutralized, as described.

6. In combination, on an aircraft, a body member, a pivot member attached to the upper portion of said body member on a horizontal axis lying transverse to the flight direction, a planing member pivotally attached with freedom in pitch on said pivot member at the side of said body member, and a dihedral fin rigidly attached to said pivoted planing member, said dihedral fin being a characteristically small externally exposed aerodynamic surface located at a substantial distance in horizontal component from the pivot axis of said pivoted planing member, having a pronounced slope in a lateral direction and having substantially no incidence in the direction of flight, whereby the freely pivoted planing member acquires a changed angle of pitch during sideslip, producing an effect like that of dihedral in a fixed wing aircraft, as described.

7. In combination, on an aircraft, a body member, an annular planing member pivotally attached at the side of said body member, a pilotable elevator attached at the rear of said annular planing member, and a flow stabilization ridge rigidly attached to the upper exposed surface of said annular planing member extending chordwise thereon, said flow stabilization ridge being a fixed position aerodynamic surface which is long in the direction of flight, low in height normal to the surface of said annular planing member, and sharp along its free edge.

8. In combination, on an aircraft, a body member, a pivot member rigidly attached horizontally transverse to said body member, an annular lifting member having a ducted passage therethrough, said lifting member being pivotally attached to said pivot member with freedom to pitch, a powered propeller mounted within said ducted passage operationally occupying a full cross section thereof and propelling a propulsive reaction stream rearwardly throughout said passage, a trimming member mounted rearwardly on said lifting member, an additional trimming member mounted rearwardly on said lifting member, and trimming member actuating means attached in said body member and attached in said lifting member, said actuating means having a torsionally yielding portion between said body member and said planing member in the region of said pivot member.

9. In a vertically rising aircraft a central body member, a powered thrusting member freely pivoted to said body member on a horizontal axis transverse to the flight direction, an elevator member hingedly attached on the rearward portion of said thrusting member lying in the propulsive reaction stream of said thrusting member, an aerodynamic thrust-adjusting member mounted in said thrusting member forward of said elevator member adjusting the propulsive reaction stream in which lies said elevator member, pilotable control means including a pilot's wheel mounted in said body member, elevator actuating means attached to said pilot's wheel and attached to said elevator member, said elevator actuating means having a portion yielding freely to relative angular displacements between said body member and said thrusting member, meanwhile said elevator member remaining at constant angle to said thrusting member and said pilotable control means remaining in constant position relative to said body member, said yielding portion lying along the pivot axis between said body member and said thrusting member, and thrust adjustment actuating means attached to said pilot's wheel and attached to said aerodynamic thrust adjusting member in said powered thrusting member, whereby said aircraft is wholly steerable by movements of said pilot's wheel, as described.

References Cited in the file of this patent

UNITED STATES PATENTS

| | | |
|---|---|---|
| 1,786,545 | Noeggerath | Dec. 30, 1930 |
| 2,118,052 | Odor | May 24, 1938 |
| 2,193,375 | Papritz | Mar. 12, 1940 |
| 2,373,575 | Lemonier | Apr. 10, 1945 |
| 2,450,821 | Zimmerman | Oct. 5, 1948 |
| 2,501,078 | Newcomb | Mar. 21, 1950 |
| 2,700,515 | Reder | Jan. 25, 1955 |
| 2,702,168 | Platt | Feb. 15, 1955 |
| 2,762,584 | Price | Sept. 11, 1956 |
| 2,848,180 | Ploger | Aug. 19, 1958 |
| 2,959,373 | Zuck | Nov. 8, 1960 |

FOREIGN PATENTS

| | | |
|---|---|---|
| 793,426 | France | Apr. 16, 1935 |
| 989,177 | France | May 23, 1951 |
| 506,664 | Belgium | May 21, 1954 |